United States Patent
Masselus

(10) Patent No.: US 8,013,469 B2
(45) Date of Patent: Sep. 6, 2011

(54) SYSTEM AND PROCESS FOR POWER SUPPLY TO A RAILWAY VEHICLE, CONVERTER, CONTROL UNIT, AND AIR-CONDITIONING UNIT FOR THE SYSTEM

(75) Inventor: Jean Emmanuel Masselus, Mont-sur-Marchienne (BE)

(73) Assignee: Alstom Transport SA, Levallois-Perret (FR)

( * ) Notice: Subject to any disclaimer, the term of this patent is extended or adjusted under 35 U.S.C. 154(b) by 911 days.

(21) Appl. No.: 11/810,364

(22) Filed: Jun. 5, 2007

(65) Prior Publication Data

US 2007/0283713 A1  Dec. 13, 2007

(30) Foreign Application Priority Data

Jun. 9, 2006 (FR) ...................................... 06 05135

(51) Int. Cl.
*H02J 3/14* (2006.01)
(52) U.S. Cl. ............ 307/31; 307/9.1; 307/10.1; 307/43; 307/58; 307/82; 191/29 R; 104/88.04
(58) Field of Classification Search .................... 307/31, 307/43, 58, 82; 191/29 R; 104/88.04
See application file for complete search history.

(56) References Cited

U.S. PATENT DOCUMENTS

| | | | | |
|---|---|---|---|---|
| 2,564,121 | A * | 8/1951 | Melcher | 290/3 |
| 4,219,071 | A | 8/1980 | Careglio et al. | |
| 4,795,859 | A * | 1/1989 | Kato et al. | 191/4 |
| 5,181,553 | A * | 1/1993 | Doi | 165/203 |
| 6,046,513 | A * | 4/2000 | Jouper et al. | 307/31 |
| 6,408,766 | B1 * | 6/2002 | McLaughlin et al. | 105/231 |
| 6,615,118 | B2 * | 9/2003 | Kumar | 701/19 |
| 6,803,672 | B2 * | 10/2004 | Gunasekera | 307/9.1 |
| 2005/0162877 | A1 * | 7/2005 | Wagoner et al. | 363/123 |
| 2007/0278059 | A1 * | 12/2007 | Afriat | 191/29 R |

FOREIGN PATENT DOCUMENTS

JP  2004-364412  12/2004

* cited by examiner

*Primary Examiner* — Rexford Barnie
*Assistant Examiner* — Justen Fauth
(74) *Attorney, Agent, or Firm* — Davidson, Davidson & Kappel, LLC

(57) ABSTRACT

A power supply system for a railway vehicle is provided including a converter able to receive information from a transmission system between a power supply unit and air-conditioning units and to deduce from this information the demand for electrical power from each air-conditioning unit, this demand indicating the electrical power required by that air-conditioning unit to cool and/or dehumidify the air within a car in which it is installed, and the first electrical converter being equipped with a module for adjusting the amplitude and/or frequency of the three-phase voltage in a power supply network in response to the demands transmitted by each air-conditioning unit.

12 Claims, 4 Drawing Sheets

SYSTEM AND PROCESS FOR POWER SUPPLY TO A RAILWAY VEHICLE, CONVERTER, CONTROL UNIT, AND AIR-CONDITIONING UNIT FOR THE SYSTEM

This claims the benefit of French Patent Application No. 06 05135, filed on Jun. 9, 2006 and hereby incorporated by reference herein.

TECHNICAL FIELD

The invention relates to a system and process for power supply to a railway vehicle, a converter, a control unit, and an air-conditioning unit for the system.

BACKGROUND TO THE INVENTION

Existing railway vehicles include a first and a second electrical converter each capable of transforming a single phase or direct electric voltage received via a catenary into a three-phase electrical voltage delivered to a first and second three-phase power supply network respectively on board, each capable of distributing electrical power to several cars of the railway vehicle, the first and second networks being electrically isolatable from one another, several air-conditioning units installed in several cars respectively, each air-conditioning unit comprising at least one compressor to produce cold air which is expelled into the interior of the car, this compressor being electrically connected to the first network in order to receive three-phase voltage power from the first converter, and auxiliary electrical loads other than the compressors electrically connected to the second power supply network to be powered with three-phase voltage by the second converter.

The term "catenary" is used to mean both a conducting wire suspended in air along which a pantograph slides to provide power to the railway vehicle and an additional rail laid on the ground against which a shoe presses in order to power the railway vehicle. This latter technology is known by the term "third rail".

Here "cold air" means air whose temperature is less than the ambient temperature within a car.

Conventionally, in order to balance the loads on the first and second converters, half of the compressors of the air-conditioning units are electrically connected to the first converter and the other half are connected to the second converter. The auxiliary loads are distributed between the first and second converters for the same reason.

Because the auxiliary loads need to be powered by a voltage and a frequency generally fixed between 50 Hz and 60 Hz, each of the first and second converters deliver this fixed frequency alternating voltage to their corresponding systems. In this situation the compressors of each air-conditioning unit are also powered by a fixed voltage and frequency and each air-conditioning unit therefore has the same electrical power to power its respective compressor or compressors.

In modern air-conditioning units the compressor systematically takes up the maximum power available on the electrical system to which it is connected in order to ensure a high level of air-conditioning comfort for the passengers in the car.

A mechanism for adjusting the temperature of the cold air expelled for the same maximum electrical power available on the first system therefore has to be provided in each air-conditioning unit. Some adjustment mechanisms in fact only reduce the energy efficiency of the air-conditioning unit to a greater or lesser extent. For example, when electrical power P is taken up by the compressor, the temperature of the cold air will be X degrees if the energy efficiency is Δ and the temperature of the cold air will be above X degrees if the energy efficiency is less than Δ.

SUMMARY OF THE INVENTION

In existing railway vehicles the electrical power taken up or consumed by each air-conditioning unit may be the same regardless of the properties (in particular the temperature and humidity) of the cold air expelled.

The invention provides a railway vehicle in which the electrical power consumed by the air-conditioning units can be adjusted.

The invention provides a railway vehicle in which:
the first converter receives information from a network for the transmission of information between a power unit and the air-conditioning units and of deducing the demand for electrical power from each air-conditioning unit from this information, this demand indicating the electrical power required by that air-conditioning unit to cool and/or dehumidify the air within the car in which it is installed, and
the first converter includes a module for adjusting the amplitude and/or frequency of the three-phase voltage delivered by the first power supply network in response to the demand transmitted by each air-conditioning unit.

The amplitude and/or frequency of the three-phase voltage delivered by the first converter need not be constant, but may on the contrary be adjusted in response to information relating to the electric power needs of each of the air-conditioning units. These power needs may in particular be expressed in the form of demands for electrical power transmitted by each of the air-conditioning units. More specifically, voltage and/or frequency in the first network can be adjusted so that these enable an air-conditioning unit to take up just the electrical power required to maintain the ambient temperature within the car close to a set temperature value. Under these conditions this air-conditioning unit operates at maximum energy efficiency. This therefore limits the electrical power consumed by that air-conditioning unit to reach the reference temperature because there has been no need for it to reduce its energy efficiency.

Thus overall, the power consumption by the train's air-conditioning units may be reduced.

Furthermore, because the first converter may be common to several air-conditioning units, the power supply system to these air-conditioning units may be simplified and therefore less costly than a system which provides for a converter incorporated in each air-conditioning unit.

Finally, passenger comfort may be increased when the compressor operates at low load in comparison with an air-conditioning unit operating on an all-or-nothing basis, for example.

Embodiments of this system may include one or more of the following features:
a set of contactors able to:
connect the compressors of the air-conditioning units to the first converter only, so that these compressors are powered from that first converter, and connect the auxiliary loads to the second converter only, so that the auxiliary loads are powered from that second converter, and alternately
connect the compressors to the second converter only, so that these compressors are powered from the second converter,
a fault detector in the first converter, and a unit for operating all the contactors which can automatically trip connection of the compressors to the first converter to connection of the same compressors to the second converter in response to the detection of a fault in the first converter;

a set of controllable contactors able to:

connect the auxiliary loads to the second converter only, so that these loads are powered from that second converter, and alternately connect the auxiliary electrical loads to the first converter only, so that these loads are powered from the first converter, a fault detector in the second converter and a unit for operating the set of contactors which can automatically trip connection of the auxiliary electrical loads to the second converter to connection of the auxiliary electrical loads to the first converter in response to the detection of a fault in the second converter, an ambient temperature sensor within each car in which an air-conditioning unit is installed, and a module for calculating an adjustment parameter for the three-phase voltage in relation to the temperature measured within the car in which the air-conditioning unit is installed and a reference temperature which has to be reached, and in which the adjustment module is capable of adjusting the voltage and/or frequency of the three-phase voltage delivered by the first network in response to that adjustment parameter so that insofar as possible the compressor which needs to take up most of the electrical power is able to do so;

each air-conditioning unit also including:

a mechanism for adjusting the temperature of the cold air expelled for the same three-phase voltage delivered to its compressor, and a unit for controlling this mechanism in relation to the amplitude and/or frequency of the three-phase voltage delivered to its compressor, a temperature measured within the car in which the air-conditioning unit is installed and a reference temperature which has to be reached.

The invention also provides an electrical converter, a control unit and an air-conditioning unit operated in the above power system.

Finally, the invention also provides a power supply process using the above power system.

BRIEF DESCRIPTION OF THE DRAWINGS

Other advantages and characteristics of the present invention will become clear from the following detailed description which is given with reference to the appended drawings which are provided purely by way of non-limiting example and in which.

In the rest of this description features and functions which are well known to those skilled in the art will not be described in detail.

DESCRIPTION OF PREFERRED EMBODIMENTS

Figure 1:
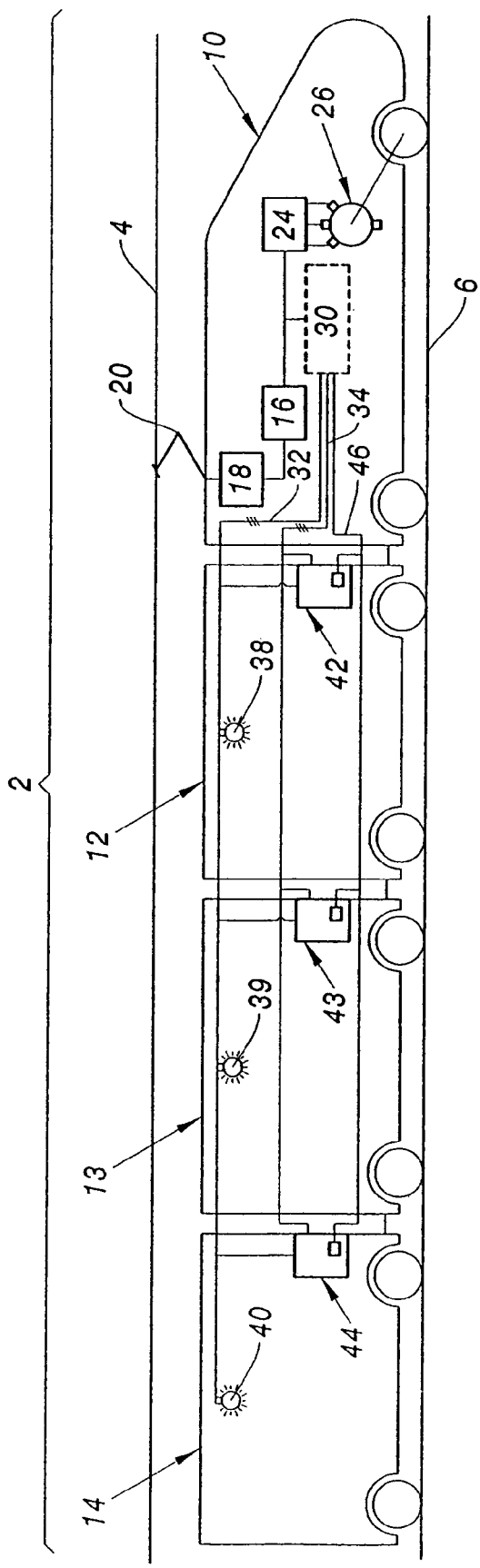
FIG. 1 is a diagrammatical illustration of the architecture of a railway vehicle.

FIG. 1 shows a railway vehicle 2 such as a train. This vehicle 2 is powered by an alternating single-phase voltage through a catenary 4 and runs on rails 6.

This vehicle 2 includes a locomotive 10 and several cars 12, 13, 14. These cars are for example cars intended to carry passengers.

Locomotive 10 includes a transformer 16 connected to catenary 4 through the intermediary of a circuit breaker 18 and then a pantograph 20 in succession. The alternating single-phase voltage from catenary 4 is over 5000 Vac, and is for example equal to 25,000 Vac. Transformer 16 delivers a single-phase alternating output voltage $U_{ac}$. Voltage $U_{ac}$ is used by a device 24 to power the traction motors 26 of locomotive 10 (only one motor 26 is shown in FIG. 1).

Vehicle 2 is equipped with a system for powering auxiliary loads and air-conditioning units. More specifically, voltage $U_{ac}$ is also used by a unit 30 powering auxiliary electrical loads and air-conditioning units in vehicle 2. For this purpose unit 30 is connected to two wiring networks 32 and 34 for the distribution of electrical power in the various cars of the train. Networks 32 and 34 deliver electrical power $P_1$ and $P_2$ respectively to the electrical equipment connected there. In this embodiment three-phase voltages $V_1$ and $V_2$ on networks 32 and 34 lie between 50 Vac and 450 Vac. Voltage $V_1$ is constant and is for example equal to 400 Vac.

The air-conditioning units may be used to cool and/or dehumidify the air in cars 12, 13, 14.

For the most part the auxiliary loads installed in vehicle 2 require a three-phase voltage of fixed amplitude and frequency. These auxiliary loads are, for example, a compressor for the vehicle's compressed air, the headlamps on vehicle 2, lighting devices in each of cars 12 to 14, fans and other equipment. To simplify FIG. 1, only bulbs 38, 39, 40 have been represented to illustrate an example of an auxiliary load requiring a fixed voltage and frequency. Bulbs 38, 39, 40 are each located in a respective car and are connected to network 32. Bulbs 38, 39, 40 systematically consume power $P_1$.

Each car also includes an air-conditioning unit 42, 43, 44. In this embodiment air-conditioning units 42, 43, 44 are connected to both networks 32 and 34.

Each air-conditioning unit 42, 43, 44 is also connected to a network 46 transmitting information connecting unit 30 to each of the air-conditioning units. Here this network 46 is a bi-directional network for the transmission of information located in vehicle 2.

In the rest of this description it will be assumed that the air-conditioning units are all identical.

Figure 2:
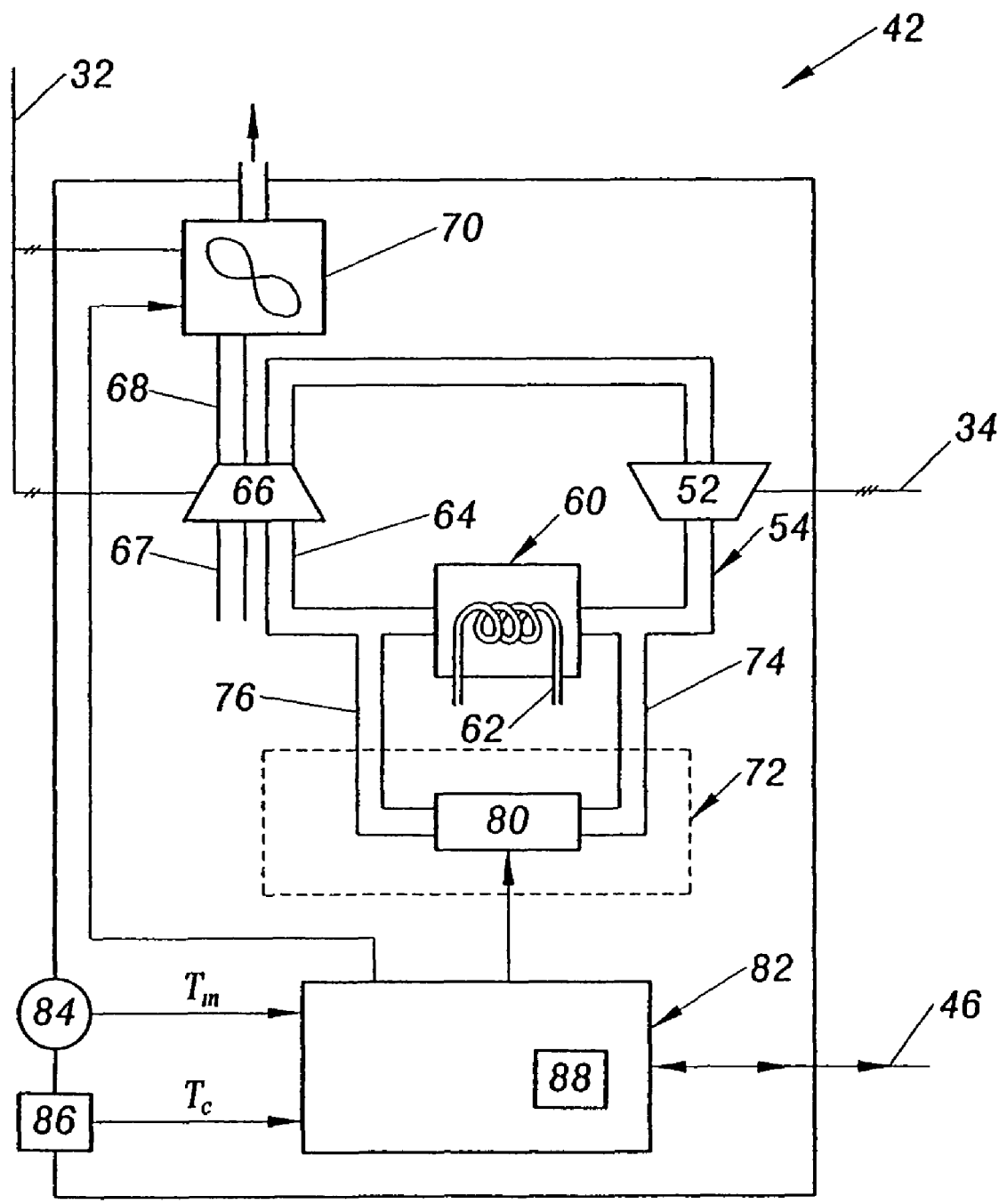
FIG. 2 is a diagrammatical illustration of the architecture of an air-conditioning unit installed in the railway vehicle in FIG. 1.

By way of illustration, FIG. 2 shows the architecture of air-conditioning unit 42 in greater detail.

Air-conditioning unit 42 includes a pipe 50 delivering a cooling fluid to the interior of compressor 52. Compressor 52 is electrically connected to network 34 to receive a three-phase voltage power supply. This compressor 52 systematically takes up the maximum electrical power for it from network 34. The compressor of an air-conditioning unit alone generally consumes more than 50% and typically more than 80% of the total electrical power required for operation of the air-conditioning unit.

The cooling fluid compressed by compressor 52 is then injected into a pipe 54. Following the compression operation, the temperature of the fluid in pipe 54 is higher than that of the fluid in pipe 50.

A heat exchanger or condenser 60 is connected to one extremity of pipe 54. This condenser is designed to lower the temperature of the compressed fluid. For example, condenser 60 is air-cooled. The compressed fluid in contact with the walls of the condenser cools and condenses.

The compressed fluid cooled by condenser 60 is injected into an outlet pipe 64 in order to be delivered to an evaporator 66. Between the condenser and the evaporator the fluid is decompressed in a pressure reducer. Evaporator 66 cools ambient air mixed with external air captured via a pipe 67. The cooled ambient air is passed through a pipe 68 to a fan 70 which expels the cold air into the interior of the car.

The cooling fluid used to cool the ambient air by evaporator 66 is then returned to pipe 50 in order to be recycled.

Dehumidifiers for the dehumidification of air which may be included in each air-conditioning unit are known in themselves and are not described.

With the exception of compressor 52, the other electrical equipment in air-conditioning unit 42, such as a fan for evaporator 66 or condenser fan 70, are electrically connected to network 32, for example.

Air-conditioning unit 42 also includes a mechanism 72 for adjusting the temperature of the cold air expelled for a constant three-phase voltage powering compressor 52. Mechanism 72 is, for example, the mechanism for diverting hot fluid, known by the English name of "hot gas bypass." This mechanism 72 is fluidly connected to pipe 54 through a pipe 74 on the one hand and on the other hand to pipe 64 through a pipe 76, without passing through condenser 60. A control valve 80 is fluidly connected between pipes 74 and 76 so as to control the flow of fluid delivered directly from pipe 54 to pipe 50 without passing through condenser 60.

Air-conditioning unit 42 also includes a local unit 82 for controlling the air-conditioning unit. This unit 82 is connected to:

a sensor 84 for ambient temperature $T_m$ located for example in car 12, a unit 86 for determining the reference temperature $T_c$, temperature adjustment mechanism 72, and network 46.

Sensor 84 and unit 86 form part of air-conditioning unit 42.

Unit 86 is for example a human-machine interface such as a keyboard through which a value for reference temperature $T_c$ can be entered. Unit 86 can also automatically determine reference temperature $T_c$ in response to a measurement of the temperature outside the car.

Unit 82 can control valve 80 in relation to temperature $T_m$, reference temperature $T_c$ and the three-phase voltage available in network 34.

Unit 82 also includes a module 88 for calculating a parameter for adjusting the three-phase voltage powering compressor 52. This parameter indicates the three-phase voltage required on network 34 for compressor 52 to be able to take up the minimum electrical power $P_{min-i}$ required to maintain the ambient temperature within the car close to the reference temperature $T_c$. Here this adjustment parameter is a frequency reference value $f_{min-i}$ for the three-phase voltage powering compressor 52. Unit 82 is also capable of sending a demand for electrical power on network 46 indicating the electrical power required by its compressor 52. For this purpose the demand sent includes the frequency $f_{min-i}$ corresponding to electrical power $P_{min-i}$.

Figure 3:
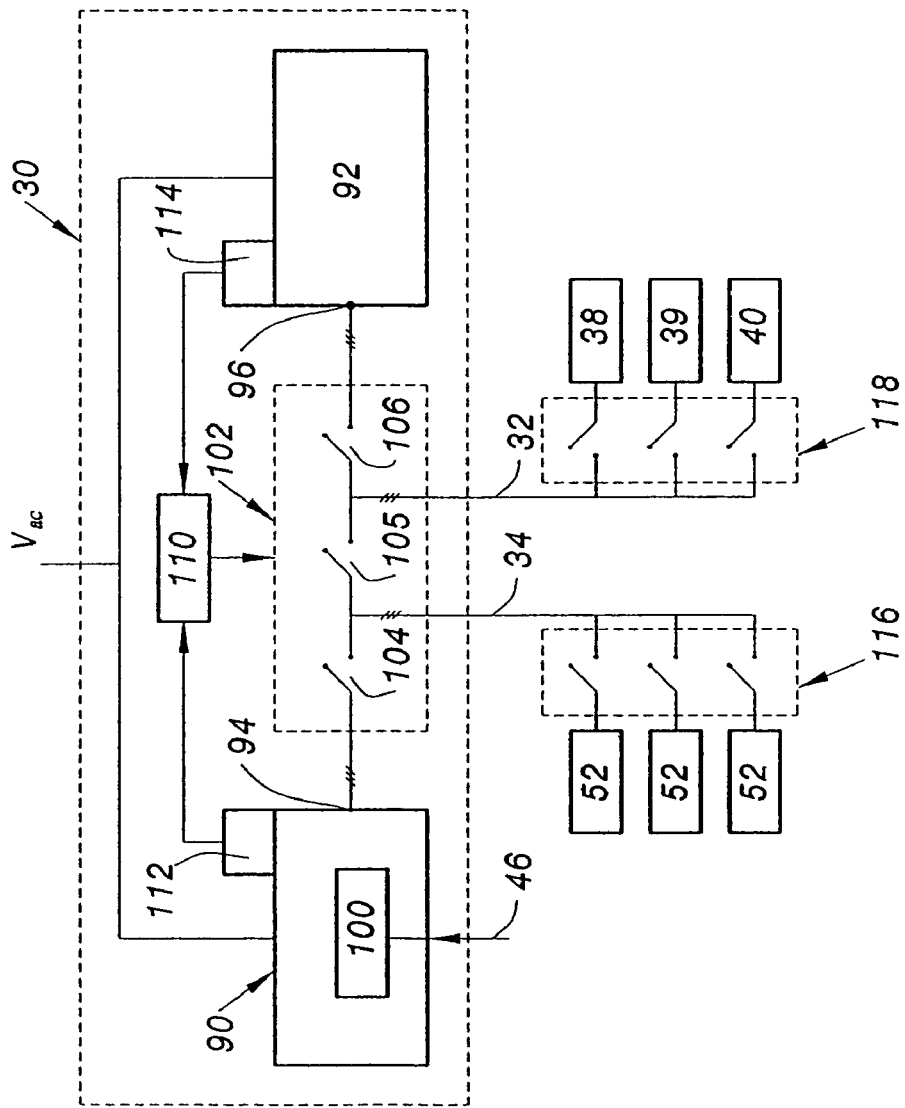
FIG. 3 is a diagrammatical illustration of a power supply unit installed in the railway vehicle in FIG. 1.

FIG. 3 illustrates power supply unit 30 in greater detail.

Unit 30 includes two converters 90 and 92 each powered by a single-phase voltage $U_{ac}$. Each of these converters is capable of converting voltage $U_{ac}$ into the three-phase voltage $V_{ac}$ delivered from three-phase voltage outputs 94 and 96 respectively.

Converter 92 is for example a converter delivering a three-phase voltage of fixed amplitude and frequency.

Conversely, converter 90 is a converter capable of varying the three-phase voltage delivered at output 94 so that the electrical power $P_2$ taken up by the air-conditioning units corresponds to the air-conditioning units demand. Here converter 90 is capable of varying the electrical power $P_2$ taken up from network 34 by varying both the amplitude and the frequency of the three-phase voltage delivered. Preferably the three-phase voltage is modified in such a way as to preserve a constant ratio between voltage and frequency.

For this purpose converter 90 includes a module 100 for regulating the amplitude and frequency of the three-phase voltage available on output 94. Here this module 100 is connected to a network 46 in such a way as to receive the demands for electrical power and more specifically the frequencies $f_{min-i}$ sent by each of air-conditioning units 42, 43, 44. Typically module 100 is a software module, for example.

In this embodiment the maximum power which can be delivered by each of converters 90 and 92 may be sufficient to allow the priority loads to be powered by just one of these converters. The priority loads include, for example, half of compressors 52 and half of the auxiliary loads.

Outputs 94 and 96 are electrically connected to networks 34 and 32 through a set of contactors 102.

By way of illustration, this set 102 includes three contactors 104, 105, 106.

Contactor 104 is capable of connecting output 94 to network 34 and alternately of electrically isolating output 94 from network 34.

Contactor 105 is capable of connecting networks 32 and 34 to each other electrically, and, alternately, electrically isolating network 32 from network 34.

Contactor 106 is capable of connecting output 96 to network 32 and alternately of electrically isolating output 96 from network 32.

To simplify FIG. 3, contactors 104, 105, 106 are illustrated using the symbol for a single-phase contactor. The contactors 104, 105, 106 are however three-phase contactors capable of connecting and alternately disconnecting the conductors corresponding to each of the phases.

Unit 30 also includes a unit 110 for operating the contactors of set 102. Unit 110 is connected to two fault detectors 112 and 114 with converters 90 and 92 respectively. Unit 110 can control the switching of contactors 104 to 106 in response to the fault indications delivered by detectors 112 and 114.

In FIG. 3, two sets of controllable cut-off contactors 116 and 118 have also been shown. The contactors in set 116 can selectively electrically isolate one or more of compressors 52 from network 34. Likewise the contactors in set 118 can selectively electrically isolate one or more of the auxiliary loads from network 32.

Figure 4:
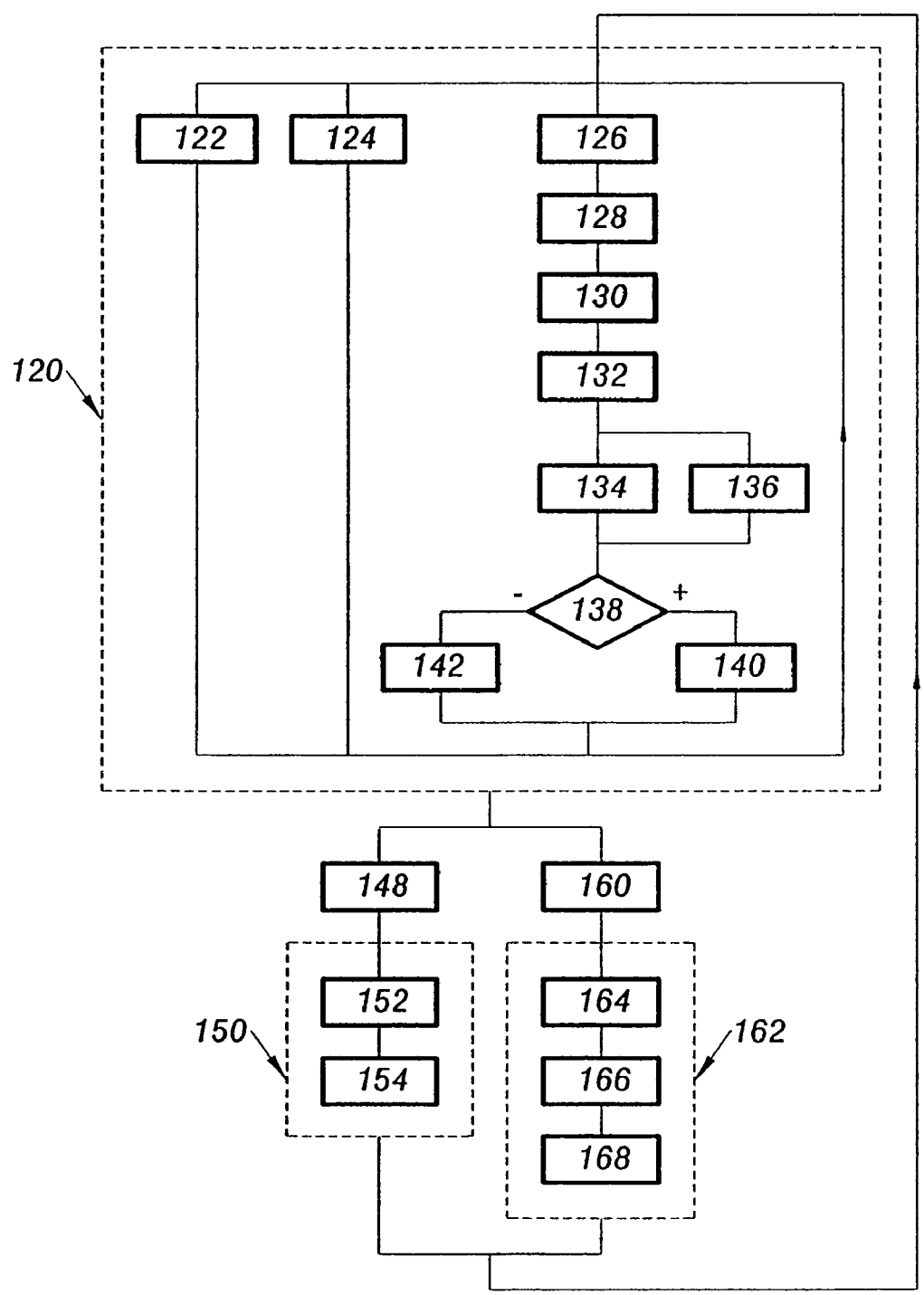
FIG. 4 is a flow chart of a process for powering the air-conditioning units in the railway vehicle in FIG. 1.

The operation of vehicle 2 will now be described with reference to the process in FIG. 4.

Initially, when converters 90 and 92 operate normally, vehicle 2 operates in a normal operating mode 120. When entering this mode, in a stage 122, the control unit causes switches 104 and 106 to close and switch 105 to open. Thus output 94 is only connected to network 34, output 96 is only connected to network 32 and networks 32 and 34 are electrically isolated from each other.

It will therefore be noted that in normal operation all the compressors 52 of vehicle 2 are powered by converter 90 while all the auxiliary loads other than compressors 52 are powered by converter 92. Furthermore, in mode 120, converter 90 only may be used to power the compressors whereas converter 92 only may be used to power the auxiliary loads other than the compressors.

In parallel, in a stage 124, converter 92 delivers a three-phase voltage of constant amplitude and frequency to network 32. This corresponds to an electrical power $P_1$ delivered on network 32.

Likewise in parallel, in a stage 126, each sensor 84 installed in the car measures temperature $T_m$. In the course of stage 126 unit 86 may possibly determine a new reference temperature $T_c$ for a given car in order to refresh the previous reference temperature $T_c$ placed in memory.

Then, in a stage 128, unit 82 of each air-conditioning unit calculates the adjustment parameter $f_{min-i}$ corresponding to the power $P_{min-i}$ required by its compressor 52 in order to reduce the ambient temperature within the car to the reference temperature $T_c$. This calculation is for example a function of only the measured temperature $T_m$ and the reference temperature $T_c$. More specifically, unit 82 establishes the frequency $f_{min-i}$ which the power supply voltage on network 34 should have in order for the electrical power taken out by its compressor from this system to be equal to the power $P_{min-i}$. Once stage 128 has been completed, in the course of a stage 130 module 88 of each air-conditioning unit sends a demand for electrical power containing the frequency $f_{min-i}$ to adjustment module 100 via network 46. This request for electrical power indicates to module 100 the electrical power required by the compressor of that air-conditioning unit to maintain the air temperature within the car close to the reference temperature $T_c$. In fact here frequency $f_{min-i}$ is used to indicate the electrical power required by compressor 52.

Module 100 receives information relating to demands for power via network 46 and in response, in the course of a stage 132, this module 100 selects the highest frequency $f_{min-i}$ received and adjusts the frequency of the three-phase voltage $V_{ac}$ so that frequency of the three-phase voltage $V_{ac}$ is equal to the greater of the frequencies $f_{min-i}$ received. In stage 132 module 100 also adjusts the voltage proportionally to the greatest of received frequencies $f_{min-i}$ in such a way as to maintain the ratio between the voltage and frequency delivered via network 34 constant.

Subsequently, in a stage 134, converter 90 provides the three-phase voltage corresponding to the adjustment made in stage 132 on output 94. This three-phase voltage corresponds to an electrical power $P_2$ consumed or taken up by the compressors. The frequency of the three-phase voltage on network 34 will be indicated below by $f_2$.

In parallel with stage 134, in the course of a stage 136 module 100 also transmits its frequency value $f_2$ to each of air-conditioning units 42, 43, 44 through network 46.

In response to receiving frequency $f_2$ through network 46, in a stage 138 each air-conditioning unit 82 determines if the power consumed from network 34 is greater than or equal to the power $P_{min-i}$ calculated in stage 128. For example, in the course of stage 138 unit 82 compares the frequency $f_{min-i}$ calculated during stage 128 with frequency $f_2$ available.

If frequency $f_2$ available is equal to the frequency $f_{min-i}$ previously calculated in stage 128, then in the course of a stage 140 unit 82 commands valve 80 to close totally so that the energy efficiency of the air-conditioning unit is a maximum. In this condition the fluid injected into pipe 54 cannot reach pipe 64 without passing through condenser 60.

If this is not the case, i.e. if power $P_2$ taken up is more than the power $P_{min-i}$ which unit 82 calculated in stage 128, then in a stage 142 unit 82 commands valve 80 to open, in response to both the measured temperature $T_m$ and the reference temperature $T_c$ for the interior of the car within which the air-conditioning unit is installed and the characteristic of the three-phase voltage available on network 34. For example, the characteristic of the three-phase voltage taken into account by unit 82 is the frequency $f_2$. Through this the air-conditioning unit can generate cold air having a temperature lower than that of the other air-conditioning units, while the electrical power taken out by the respective compressor is the same as that taken up by the compressors of the other air-conditioning units.

As long as none of the converters are faulty, stages 122 to 140 are repeated.

If in the course of a stage 148 detector 112 detects that converter 90 is faulty then the vehicle leaves normal operating mode and enters a first degraded operating mode 150. When this first degraded operating mode is entered, in the course of a stage 152, unit 110 commands contactor 104 to open and contactors 105 and 106 to close. Thus on completion of stage 152 networks 34 and 32 are simultaneously electrically connected to output 96 of converter 92 and are electrically isolated from converter 90.

It may happen, in parallel with stage 152, that the contactors of sets 116 and 118 are commanded to electrically connect only half of compressors 52 to network 34 and only half of the auxiliary loads to network 32. Preferably, the compressors and the auxiliary loads connected through networks 32 or 34 are those considered essential for the operation of vehicle 2.

Then, in a stage 154 converter 92 delivers a three-phase voltage of fixed amplitude and frequency on its output 96 regardless of the demands for electrical power transmitted by the air-conditioning units.

Thus the first degraded operating mode makes it possible to continue to power some of compressors 52 even if converter 90 is faulty.

If in the course of a stage 160 detector 114 detects a fault in converter 92 then normal operating mode is interrupted and the process continues through a second degraded operating mode 162.

At the start of mode 162, in the course of a stage 164, unit 110 commands contactor 106 to open and contactors 104 and 105 to close. Thus at the end of stage 164 networks 32 and 34 are electrically connected to output 94 and electrically isolated from output 96.

Simultaneously, sets of contactors 116 and 118 are commanded to only connect half of the compressors to network 34 and only half of the auxiliary loads to network 32.

Then, in the course of a stage 166, unit 110 acts on converter 90 so that the latter delivers a three-phase voltage of fixed amplitude and frequency on output 94 regardless of the demands for electrical power from the air-conditioning units. This three-phase voltage is identical to the three-phase voltage that converter 92 would have delivered.

Then, in a stage 168 converter 90 delivers the three-phase voltage corresponding to the adjustment in stage 166 to both networks 32 and 34 at the same time. Thus this second degraded operating mode makes it possible to continue to power some of the auxiliary loads when converter 92 is faulty.

The term "faulty converter" here is meant as a converter which is no longer capable of delivering the required electrical power at its three-phase output.

Many other embodiments are possible. For example as a variant frequency $f_2$ on network 34 is not communicated to the control unit for each air-conditioning unit through network 46. This information about the electrical frequency delivered by the network 34 is then determined locally by the control unit. For this purpose the electrical power received by compressor 52, the temperature of the compressed fluid leaving compressor 52 or the temperature of the air leaving the evaporator will be measured.

As a variant, vehicle 2 is designed to be connected to a catenary distributing a direct voltage. In this variant, transformer 16 is typically dispensed with.

In the case of a railway vehicle having a large number of cars it may be necessary to use several power supply units such as unit 30. In this situation unit 30 and power supply networks 32 and 34 are duplicated as many times as necessary to power the air-conditioning units and auxiliary loads in each of the cars.

It is also possible to vary the electrical power taken up by the compressors by varying only the amplitude or only the frequency of the three-phase voltage delivered by converter 90.

Finally, calculation module 88 may as a variant be incorporated in adjustment module 100. In this variant the demands for electrical power sent to adjustment module 100 via network 46 contain the measured temperature $T_m$ and the reference temperature $T_c$ allocated to each air-conditioning unit.

As a variant, the information transmitted on the system with regard to the power requirements of the air-conditioning units may originate from components other than the air-conditioning units, in particular the temperature or humidity sensors located in the cars independently of the air-conditioning units. The first converter is then in a position to deduce the power demand of each air-conditioning unit from this information.

The various embodiment modes for vehicle 2 described here may have the following advantages:

set 102 of contactors makes it possible to power the compressors from converter 92 in the event of a fault in converter 90 and also makes it possible to power the auxiliary loads from converter 90 in the event of a fault in converter 92, sets of contactors 116 and 118 make it possible to avoid each converter 90, 92 being rated to power compressors 52 and all the auxiliary loads at the same time, the fault detectors and the control unit can automatically control tripping from normal operating mode to degraded operating mode, the voltage and frequency at the output from converter 90 can be adjusted in such a way that these enable the air-conditioning unit needing more power to take up that power to regulate the temperature around the reference temperature $T_c$, the adjustment mechanism incorporated in each of the air-conditioning units makes it possible to individually adjust the temperature in each car while the electrical power received by each compressor is the same, especially in degraded mode.

The invention claimed is:

1. A power supply system for a railway vehicle having a plurality of cars comprising:
    a first electrical converter including a module;
    a second electrical converter, the first and second electrical converters transforming a single phase or direct electric voltage received via a catenary into a three-phase electrical voltage delivered to a first three-phase power supply network and a second three-phase power supply network respectively on board the railway vehicle, the first and second electrical converters distributing electrical power to the plurality of cars, the first and second power supply networks being electrically isolatable from one another;
    at least one air-conditioning unit installed in each of the plurality of cars, each air-conditioning unit including at least one compressor producing cold air expelled into an interior of the car, the at least one compressor electrically connected to the first three-phase power supply network and receiving three-phase voltage power from the first converter; and
    a plurality of auxiliary electrical loads other than the one compressors electrically connected to the second power supply network to be powered with three-phase voltage by the second converter;
    a third network for transmitting from each air-conditioning unit to the first electrical converter the respective demands of each air-conditioning unit, each demand indicating the electrical power required by each air-conditioning unit to cool or dehumidify the air within the car of the air-conditioning unit,
    the module adjusting both the amplitude of the three-phase voltage and the frequency of the three-phase voltage delivered by the first power supply network in response to the demands transmitted by the air-conditioning units.

2. The system as recited in claim 1 further comprising a set of controllable contactors capable of connecting the plurality of auxiliary loads to the second converter only, so the auxiliary loads are powered from the second converter, and connecting the at least one compressors to the first converter only, so the compressors are powered from the first converter, and alternately connecting the compressors to the second converter only, so the compressors are powered from the second converter.

3. The system as recited in claim 2 further comprising a detector and a unit controlling the set of controllable contactors so that, when the detector detects a fault in the first converter, the unit automatically changes connection of the at least one compressors from the first converter to the second converter.

4. The system as recited in claim 1 further comprising a set of controllable contactors connecting the auxiliary electrical loads other than the compressors to the second converter only so the auxiliary electrical loads are powered from the second converter, and alternately connecting the auxiliary electrical loads to the first converter only so the auxiliary electrical loads are powered only from the first converter.

5. The system as recited in claim 4 further comprising a detector and a unit for controlling the set of controllable contactors so that, when the detector detects a fault in the second converter the unit automatically changes connection of the auxiliary electrical loads from the second converter to the first converter.

6. The system as recited in claim 1 further comprising:
    a sensor for ambient temperature in each car including an air-conditioning unit; and
    an adjustment module calculating an adjustment parameter for adjusting the three-phase voltage in response to the ambient temperature measured in each car and a reference temperature to be reached;
    the adjustment module adjusting both the amplitude voltage and the frequency of the three-phase voltage in the first power supply network in response to the adjustment parameter so one of the compressors takes requiring a greatest amount of electrical power receives the greatest amount of electrical power.

7. The system as recited in claim 1 wherein each air-conditioning unit includes a temperature adjustment mechanism adjusting temperature of the cold air expelled for the three-phase voltage delivered to the at least one compressor and a unit controlling the temperature adjustment mechanism in response to both the amplitude and the frequency of the three-phase voltage delivered to the at least one compressor, the temperature adjustment mechanism adjusting a temperature measured within the car to a reference temperature to be reached.

8. A control unit for an air-conditioning unit in the system as recited in claim 7, the control unit controlling the temperature adjustment mechanism in response to both the amplitude voltage and the frequency of the three-phase voltage delivered to the at least one compressor, the temperature adjustment mechanism adjusting a temperature measured within the car to a reference temperature to be reached.

9. An air-conditioning unit comprising the control unit as recited in claim 8.

10. A method of supplying power to a railway vehicle using the power supply system as recited in claim 1 comprising:
   adjusting both the amplitude and the frequency of the three-phase voltage delivered by the first power supply network in response to the demands for electrical power transmitted by each air-conditioning unit.

11. The system as recited in claim 1 wherein each demand sent by each air-conditioning unit includes a respective frequency corresponding to the electronic power required by the air conditioning unit.

12. The system as recited in claim 1 wherein the module adjusts the three-phase voltage in such a way as to keep a constant ratio between voltage and frequency.

* * * * *

UNITED STATES PATENT AND TRADEMARK OFFICE
CERTIFICATE OF CORRECTION

| | | |
|---|---|---|
| PATENT NO. | : 8,013,469 B2 | Page 1 of 1 |
| APPLICATION NO. | : 11/810364 | |
| DATED | : September 6, 2011 | |
| INVENTOR(S) | : Jean Emmanuel Masselus | |

It is certified that error appears in the above-identified patent and that said Letters Patent is hereby corrected as shown below:

Column 9, lines 64 to 65, of claim 1:

"a plurality of auxiliary electrical loads other than the one compressors..."

should read

"the a plurality of auxiliary electrical loads other than the at least one compressor..."

and, Column 10, line 50, of claim 6:

"parameter so one of the compressors takes requiring..."

should read

"parameter so one of the compressors requiring..."

Signed and Sealed this
Twenty-fifth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,013,469 B2 | Page 1 of 1 |
| APPLICATION NO. | : 11/810364 | |
| DATED | : September 6, 2011 | |
| INVENTOR(S) | : Jean Emmanuel Masselus | |

It is certified that error appears in the above-identified patent and that said Letters Patent is hereby corrected as shown below:

Column 9, lines 64 to 65, of claim 1:

"a plurality of auxiliary electrical loads other than the one compressors..."

should read

"a plurality of auxiliary electrical loads other than the at least one compressor..."

and, Column 10, line 50, of claim 6:

"parameter so one of the compressors takes requiring..."

should read

"parameter so one of the compressors requiring..."

This certificate supersedes the Certificate of Correction issued October 25, 2011.

Signed and Sealed this
Nineteenth Day of February, 2013

Teresa Stanek Rea
*Acting Director of the United States Patent and Trademark Office*